United States Patent
Kanomata

(10) Patent No.: US 9,792,237 B2
(45) Date of Patent: Oct. 17, 2017

(54) INFORMATION PROCESSING APPARATUS CAPABLE OF CONNECTING WITH PERIPHERAL DEVICE AND TERMINAL APPARATUS CAPABLE OF COMMUNICATING WITH THE INFORMATION PROCESSING APPARATUS

(71) Applicant: TOSHIBA TEC KABUSHIKI KAISHA, Tokyo (JP)

(72) Inventor: Mikihiro Kanomata, Shizuoka (JP)

(73) Assignee: Toshiba TEC Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/822,320

(22) Filed: Aug. 10, 2015

(65) Prior Publication Data
US 2016/0062933 A1    Mar. 3, 2016

(30) Foreign Application Priority Data
Sep. 3, 2014    (JP) ................................. 2014-179477

(51) Int. Cl.
| | |
|---|---|
| G06F 3/00 | (2006.01) |
| G06F 13/12 | (2006.01) |
| G06F 13/38 | (2006.01) |
| G06F 9/44 | (2006.01) |

(52) U.S. Cl.
CPC .......... *G06F 13/385* (2013.01); *G06F 9/4413* (2013.01)

(58) Field of Classification Search
None
See application file for complete search history.

(56) References Cited

U.S. PATENT DOCUMENTS

| 7,664,885 | B2 * | 2/2010 | Carapelli ................. H01Q 1/00 |
| | | | 709/220 |
| 2013/0117439 | A1 * | 5/2013 | Oliver ................. H04L 65/1069 |
| | | | 709/224 |
| 2013/0135674 | A1 * | 5/2013 | Hirabayashi ........... G06K 15/02 |
| | | | 358/1.15 |

FOREIGN PATENT DOCUMENTS

| JP | 2005049917 | | 2/2005 |
| JP | 2008015616 | A | 1/2008 |
| JP | 2008193217 | A | 8/2008 |
| JP | 2011242822 | A | 12/2011 |
| JP | 2013012247 | A | 1/2013 |

OTHER PUBLICATIONS

Japanese Office Action dated May 23 2017, filed in Japanese counterpart Application No. 2014-179477, 6 pages (with translation).

* cited by examiner

*Primary Examiner* — David E Martinez
(74) *Attorney, Agent, or Firm* — Patterson & Sheridan, LLP

(57) ABSTRACT

According to an embodiment, an information processing apparatus includes a communication control module and a peripheral device control module. The communication control module transmits property information including connection destination information to an external apparatus via a communication interface for establishing communication with the external apparatus and receives an operation request from the external apparatus for which the communication has been established via the communication interface. The peripheral device control module causes the peripheral device connected to an input/output interface to operate in response to the operation request received from the external apparatus.

6 Claims, 7 Drawing Sheets

INFORMATION PROCESSING APPARATUS CAPABLE OF CONNECTING WITH PERIPHERAL DEVICE AND TERMINAL APPARATUS CAPABLE OF COMMUNICATING WITH THE INFORMATION PROCESSING APPARATUS

CROSS-REFERENCE TO RELATED APPLICATIONS

This application is based upon and claims the benefit of priority from the prior Japanese Patent Application No. 2014-179477, filed on Sep. 3, 2014, the entire contents of which are incorporated herein by reference.

FIELD

An embodiment described herein generally relates to an information processing apparatus and a terminal apparatus that uses a peripheral device connected to the information processing apparatus.

BACKGROUND

From the past, stationary POS (Point of Sales) terminals for performing product sales registration and settlement processing are introduced in shops such as supermarkets. Peripheral devices such as a code reader that reads barcodes or the like attached to products, a card reader that reads information from magnetic cards, and a printer are connected to a POS terminal. In general, a one-on-one structure is employed, in which one peripheral device or a set of peripheral devices is provided to one POS terminal. Furthermore, in recent years, shops that introduce mobile information terminals such as tablets as mobile POS terminals are increasing.

However, in the structure of the related art described above, an operator of a POS terminal cannot easily use the peripheral devices from the mobile POS terminal. For example, the operator such as a shop assistant needs to carry the peripheral devices with the mobile POS terminal. Moreover, the shop assistant needs to perform, at a position where the peripheral devices are provided, a task of disconnecting the peripheral devices from another POS terminal and connecting them to the mobile POS terminal. In view of the circumstances as described above, a technique with which user-friendliness regarding a use of the peripheral device can be improved is desired.

DETAILED DESCRIPTION

Figure 1:
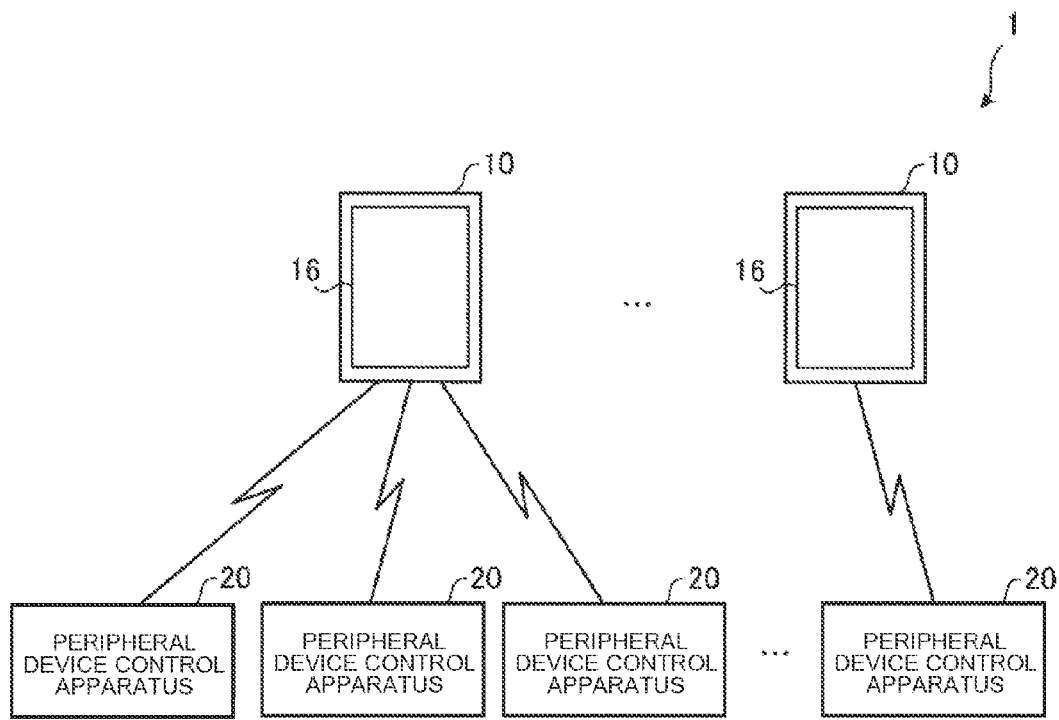
FIG. 1 is a diagram showing a structure of a POS system including POS terminals and control apparatuses for a peripheral device according to a first embodiment.

According to one embodiment, an information processing apparatus includes a communication interface, an input/output interface, a communication control module, and a peripheral device control module. The communication interface is used for communicating with an external apparatus. The input/output interface connects a peripheral device to be used by the external apparatus. The communication control module transmits property information including connection destination information to the external apparatus via the communication interface for establishing communication with the external apparatus. The communication control module also receives an operation request from the external apparatus for which the communication has been established via the communication interface. The peripheral device control module causes the peripheral device connected to the input/output interface to operate in response to the operation request received from the external apparatus.

Hereinafter, an information processing apparatus and a terminal apparatus according to an embodiment will be described with reference to the drawings. In the drawings, the same reference numerals denote the same or similar parts. The information processing apparatus and the terminal apparatus of the following embodiment are those of one embodiment, and structures, specifications, and the like of the apparatuses are not limited. This embodiment is an application example with respect to a POS system that is introduced in shops such as a supermarket.

FIG. 1 is a diagram showing a structure of a POS system of this embodiment. As shown in FIG. 1, the POS system 1 includes POS terminals 10 and peripheral device control apparatuses 20. The POS terminal 10 and the control apparatus 20 are wirelessly communicable. The communication between the POS terminal 10 and the control apparatus 20 may be performed via a communication device such as an access point. Furthermore, the number of POS terminals 10 and control apparatuses 20 to be included in the POS system 1 is not limited.

The apparatuses included in the POS system 1 will be described below.

Figure 2:
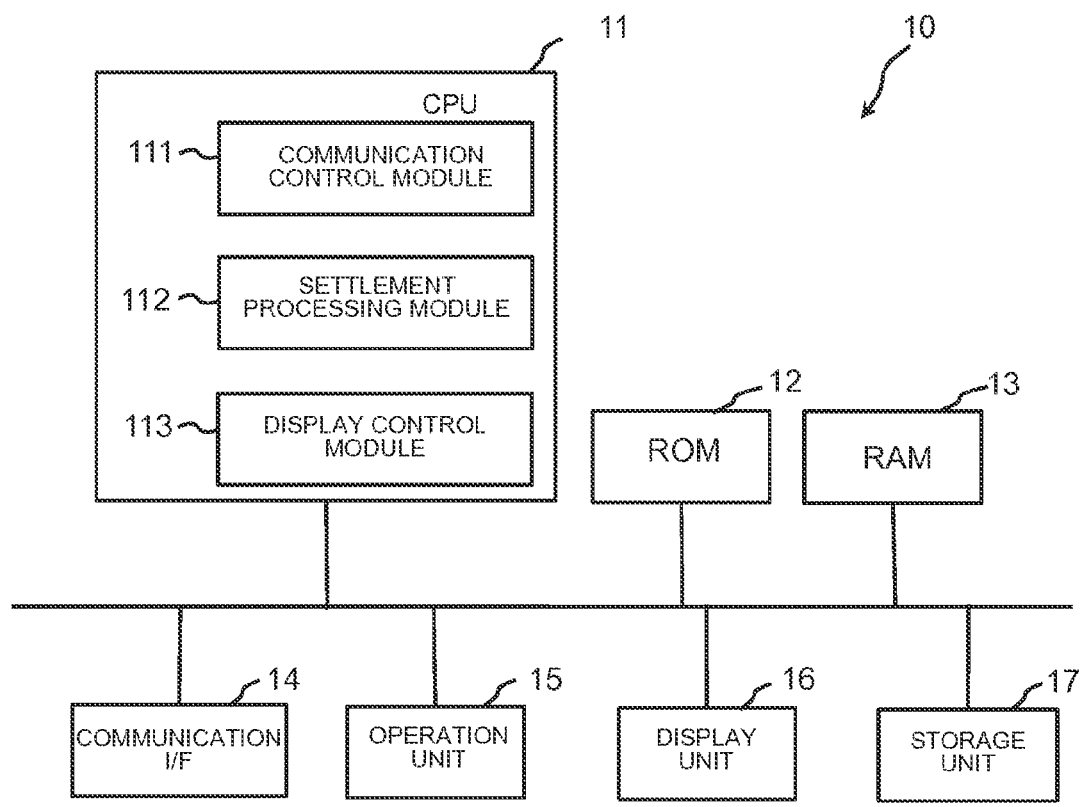
FIG. 2 is a block diagram showing a structural example of the POS terminal shown in FIG. 1.

With reference to FIG. 2, the POS terminal 10 of the POS system 1 will be described. The POS terminal 10 is a POS terminal that carries out product sales registration and settlement processing. The POS terminal 10 is a mobile terminal apparatus such as a tablet terminal and carried by an operator such as a shop assistant in a shop.

FIG. 2 is a block diagram showing a structural example of the POS terminal 10. As shown in FIG. 2, the POS terminal 10 includes a CPU (Central Processing Unit) 11, a ROM (Read Only Memory) 12, a RAM (Random Access Memory) 13, a communication interface 14 (hereinafter, simply referred to as communication I/F), an operation unit 15, a display unit 16, and a storage unit 17. The POS terminal 10 also includes a clock apparatus such as an RTC (Real Time Clock) (not shown).

The ROM 12 stores various programs to be executed by the CPU 11 and various types of data. The RAM 13 temporarily stores data and the programs when the CPU 11 executes the various programs. The CPU 11 develops the various programs stored in the ROM 12 and the storage unit 17 in the RAM 13 and executes them. The CPU 11 executes the various programs to realize functions of functional modules to be described later.

The communication I/F 14 is a wireless communication interface used for performing communication with the peripheral device control apparatus 20. The communication I/F 14 includes, for example, a wireless LAN interface or a Bluetooth (registered trademark) interface. The POS terminal 10 uses the communication I/F 14 to exchange various types of information with the control apparatus 20.

The operation unit 15 is an input apparatus including a keyboard, a pointing device, and the like. The operation unit 15 accepts an operation from an operator such as a shop assistant. The operation unit 15 outputs the accepted operation content of the shop assistant to the CPU 11.

The display unit 16 is a display device including an LCD (Liquid Crystal Display). The display unit 16 displays various types of information under control of the CPU 11. The display unit 16 may also include a touch panel. By including the touch panel, the display unit 16 also functions as the operation unit 15.

The storage unit 17 is a storage apparatus including nonvolatile storage media such as an HDD (Hard Disk Drive) and an SSD (Solid State Drive). The storage unit 17 stores various programs and various types of data related to operations of the POS terminal 10. For example, the storage unit 17 stores a product master and the like. The product master is a master file in which product information related to products handled at a shop is registered in association with product IDs. The product ID is data for identifying a product. The product information includes, for example, a product name and unit price of a corresponding product. The storage unit 17 also stores the profiles of peripheral devices DV to be described later (see FIG. 3) that are to be used by the POS terminal 10. The profile of a peripheral device DV (see FIG. 3) is a profile indicating a type name of the peripheral device DV, a function of the peripheral device DV, and the like.

In the POS system 1 of this embodiment, each of the POS terminals 10 stores the product master. The structure for storing the product master regarding the POS terminal 10 is not limited to that described above. For example, the POS terminal 10 may reference the product master stored in an external apparatus (not shown).

The CPU 11 of the POS terminal 10 includes a communication control module 111, a settlement processing module 112, and a display control module 113 (see FIG. 2). The CPU 11 executes the programs stored in the ROM 12 and the storage unit 17 to realize the functions of the functional modules 111 to 113.

The communication control module 111 exchanges various types of information with the peripheral device control apparatuses 20 via the communication I/F 14. Specifically, the communication control module 111 transmits device search data to the plurality of control apparatuses 20 via the communication I/F 14. By transmitting the search data, the communication control module 111 searches for the control apparatuses 20 capable of communicating with the apparatus itself (POS terminal 10). Further, the communication control module 111 receives, via the communication I/F 14, property information provided from the control apparatuses 20 in response to the search data. In cooperation with the display control module 113, the communication control module 111 displays a list of property information received from the control apparatuses 20 on the display unit 16 as a connection destination list. The connection destination list will be described later.

For example, the shop assistant can select a connection destination control apparatus 20 from the connection destination list displayed on the display unit 16 via the operation unit 15. As the connection destination control apparatus 20 is selected via the operation unit 15, the communication control module 111 establishes communication with the selected control apparatus 20. The communication control module 111 exchanges various types of information with the selected control apparatus 20 for which the communication has been established. For example, the communication control module 111 receives an operation request to be described later, that is output from the settlement processing module 112 and the like. The communication control module 111 transmits the operation request to the control apparatus 20 via the communication I/F 14. In addition, the communication control module 111 receives an operation result to be described later, as a response to the operation request, from the control apparatus 20 via the communication I/F 14.

The settlement processing module 112 carries out processing regarding sales registration and settlement of products purchased by customers. Specifically, the settlement processing module 112 reads out, based on a product ID, product information corresponding to the product ID from the product master stored in the storage unit 17. The product ID is acquired by a peripheral device DV (code reader etc.) to be described later. Further, the settlement processing module 112 calculates a sales price of the products from a unit price included in the product information, a sales quantity input by a shop assistant via the operation unit 15, and the like.

Upon completing the registration and settlement processing of a single deal, the settlement processing module 112 records the product ID, the sales price, and the like of the products for which the registration and settlement processing has been completed in a sales master file (not shown) or the like. The sales master file is stored in the storage unit 17, for example. The settlement processing module 112 carries out the sales registration by recording the product ID, the sales price, and the like in the sales master file or the like. The settlement processing module 112 causes the peripheral device DV (printer DV1 etc.) to be described later to output receipt information indicating a breakdown of a deal. The receipt information includes a product name, a sales quantity, a payment from a customer, and the like of the products purchased by a customer.

Further, the settlement processing module 112 generates an operation request with respect to a specific peripheral device DV based on an operation to the operation unit 15 made by a shop assistant, or the like. The specific peripheral device DV is one of peripheral devices DV connected to the control apparatus 20 (see FIG. 3). The specific peripheral device DV is one of, for example, a printer DV1, a code reader DV2, a card reader DV3, a keyboard DV4, a mouse DV5, and a drawer DV6. The operation request is a request for instructing the specific peripheral device DV to perform a predetermined operation. The communication control module 111 transmits the operation request generated by the settlement processing module 112 to the control apparatus 20 via the communication I/F 14.

For example, the settlement processing module 112 generates a print request with respect to the printer DV1 as the operation request. The print request includes print data such as receipt information. The printer DV1, for example, prints the receipt information included in the print data and outputs a receipt in response to the print request. Further, the settlement processing module 112 generates, as the operation request, a read request with respect to the code reader DV2 or the card reader DV3. The read request with respect to the code reader DV2 is a request to read a barcode attached to a product, for example. The code reader DV2 acquires a product ID or the like by reading a barcode attached to a product in response to the read request. The read request with respect to the card reader DV3 is a request to read card information. The card reader DV3 acquires a card ID or the like by reading card information recorded onto a card in response to the read request. Furthermore, the settlement processing module 112 generates, as the operation request, an input request with respect to the keyboard DV4 and the mouse DV5 as the input devices. The settlement processing module 112 generates an open request with respect to the drawer DV6 as the operation request.

Also in cooperation with the communication control module 111, the settlement processing module 112 acquires operation results with respect to the operation requests from the peripheral device control apparatus 20. The settlement processing module 112 uses the operation results acquired from the control apparatus 20 to execute the sales registration and settlement processing.

The display control module 113 controls the display unit 16 to display various types of information on the display unit 16. Specifically, in cooperation with the communication control module 111, the display control module 113 displays a display screen including the connection destination list described above on the display unit 16. Also in cooperation with the settlement processing module 112, the display control module 113 displays an operation screen related to the product sales registration and settlement processing on the display unit 16.

Hereinafter, the peripheral device control apparatus 20 will be described with reference to FIG. 3. The control apparatus 20 is an information processing apparatus capable of connecting with peripheral devices that the POS terminal 10 uses. The control apparatuses 20 are stationarily placed at predetermined different positions in a shop, for example.

Figure 3:
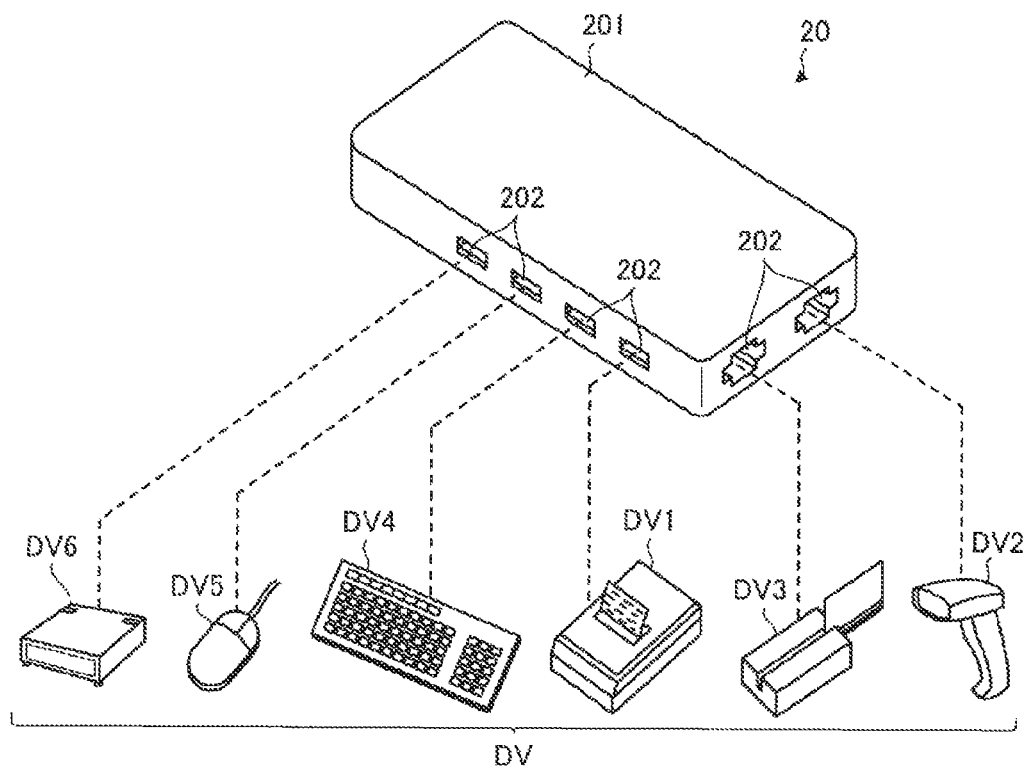
FIG. 3 is a diagram schematically showing an external structure of the control apparatus for a peripheral device shown in FIG. 1.

The peripheral device control apparatus 20 has an external structure shown in FIG. 3, for example. FIG. 3 is a diagram schematically showing the external structure of the control apparatus 20. The control apparatus 20 includes a substantially-cuboid thin-type casing 201. The control apparatus 20 also includes a plurality of input/output interfaces 202 (hereinafter, simply referred to as input/output I/Fs 202) provided on a side surface of the casing 201. Each of the input/output I/Fs 202 detachably connects various peripheral devices to the control apparatus 20. Each input/output I/F 202 is a general-purpose input/output I/F such as a USB (Universal Serial Bus) and an RS-232C.

Specifically, one of the input/output I/Fs 202 connects an output device such as the printer DV1 to the peripheral device control apparatus 20. The input/output I/Fs 202 also connect input devices such as the code reader DV2, the card reader DV3, the keyboard DV4, and the mouse DV5 to the control apparatus 20. The input/output I/Fs 202 also connect the drawer DV6 that accommodates cashes, and the like to the control apparatus 20. In the descriptions below, the peripheral devices connected to the control apparatus 20 via the input/output I/Fs 202 will collectively be referred to as peripheral devices DV. It should be noted that the types of peripheral devices DV to be connected to the input/output I/Fs 202 of the control apparatuses 20 may be the same or may differ.

Figure 4:
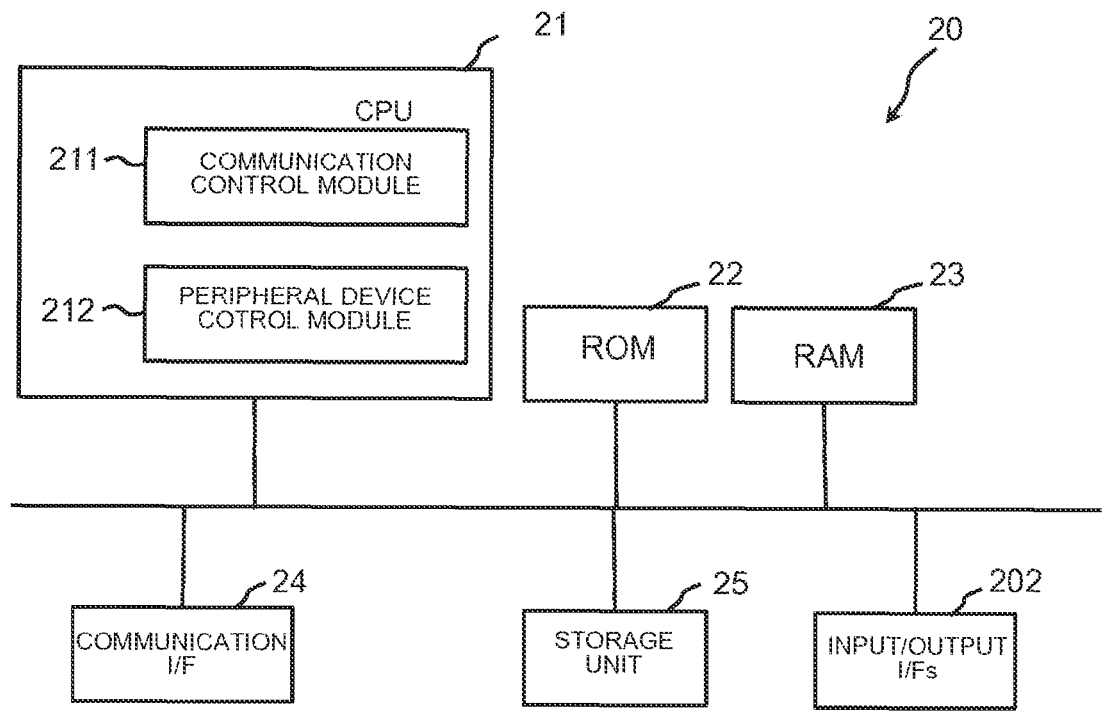
FIG. 4 is a diagram schematically showing a structural example of the control apparatus for a peripheral device shown in FIG. 1.

FIG. 4 is a block diagram showing a structural example of the peripheral device control apparatus 20. As shown in FIG. 4, the control apparatus 20 includes a CPU 21, a ROM 22, a RAM 23, a communication interface 24 (hereinafter, simply referred to as communication I/F 24), a storage unit 25, and the input/output I/Fs 202. The control apparatus 20 also includes a clock apparatus such as an RTC (not shown).

The ROM 22 stores various programs to be executed by the CPU 21 and various types of data. The RAM 23 temporarily stores data and the programs when the CPU 21 executes the various programs. The CPU 21 develops the various programs stored in the ROM 22 and the storage unit 25 in the RAM 23 and executes them to realize the functions of the functional modules to be described later.

The communication I/F 24 is a wireless communication interface used for performing communication with the POS terminal 10. By using the communication I/F 24, various types of information are exchanged with the POS terminal 10.

The storage unit 25 is a storage apparatus including nonvolatile storage media such as an HDD and an SSD. The storage unit 25 stores various programs and various types of data related to the operations of the peripheral device control apparatus 20. The storage unit 25 also stores profiles each indicating a type name, function, and the like of the peripheral device DV connected to each of the input/output I/Fs 202. The storage unit 25 also stores device driver for controlling operations of the peripheral devices DV connected to the input/output I/Fs 202.

Further, the CPU 21 of the peripheral device control apparatus 20 includes a communication control module 211 and a peripheral device control module 212. The CPU 21 executes the programs stored in the ROM 22 and the storage unit 25 to realize functions of the functional modules 211 and 212.

The communication control module 211 exchanges various types of information with the POS terminals 10 via the communication I/F 24. For example, the communication control module 211 receives search data from a POS terminal 10 via the communication I/F 24. Upon receiving the search data from the POS terminal 10, the communication control module 211 generates property information indicating properties of the apparatus itself (control apparatus 20). The communication control module 211 transmits the generated property information to the POS terminal 10.

The property information includes connection destination information such as a host name, an IP address, a MAC address, and a Bluetooth (registered trademark) address of the apparatus itself. The connection destination information is information for establishing communication between the apparatus itself (control apparatus 20) and the POS terminal 10. The property information also includes peripheral device information related to each of the peripheral devices DV connected to the apparatus itself. The peripheral device information is generated based on the profile of each peripheral device stored in the storage unit 25.

The information included in the property information is not limited to that described above. For example, installation position information indicating an installation position of the apparatus itself (control apparatus 20) is stored in the storage unit 25 or the like. The communication control module 211 may generate property information while incorporating the installation position information. Further, the method of providing property information is not limited to the pull-type provision method described above. For example, as the method of providing property information, a push-type provision method that involves unilaterally transmitting property information to the POS terminals 10 by the communication control module 211 may be adopted.

Upon establishing communication with the POS terminal 10, the communication control module 211 exchanges various types of information with the POS terminal 10. For example, the communication control module 211 receives the operation request transmitted from the POS terminal 10. Upon output of the operation result from the peripheral device control module 212, the communication control module 211 transmits the operation result to the POS terminal 10 via the communication I/F 24.

The peripheral device control module 212 is a functional module that controls the operations of the peripheral devices DV connected to the input/output I/Fs 202. Specifically, in cooperation with the communication control module 211, the peripheral device control module 212 accepts an operation request from the POS terminal 10 for which the communication has been established. Then, the peripheral device control module 212 causes the peripheral device DV instructed by the operation request to execute the operation requested by the operation request.

For example, the peripheral device control module 212 accepts a print request with respect to the printer DV1 as the operation request from the POS terminal 10. When a print request is accepted, the peripheral device control module 212 causes the printer DV1 to print the print data included in the print request. The peripheral device control module 212 also accepts a read request with respect to the code reader DV2 or the card reader DV3 as the operation request. When a read request is accepted, the peripheral device control module 212 reads information using an instructed device (code reader DV2 or card reader DV3). The peripheral device control module 212 also accepts an input request with respect to the input device (keyboard DV4 and mouse DV5) as the operation request. When an input request is accepted, the peripheral device control module 212 acquires input values of the input devices. The peripheral device control module 212 also accepts an open request with respect to the drawer DV6 as the operation request. When an open request is accepted, the peripheral device control module 212 puts the drawer DV6 to an open state.

In cooperation with the communication control module 211, the peripheral device control module 212 provides the operation results of the peripheral devices DV with respect to the operation requests described above to the POS terminal 10.

When a print request is accepted, for example, the peripheral device control module 212 provides a print result (print success, print failure, etc.) of the printer DV1 to the POS terminal 10 as the operation result. When a read request is accepted, the peripheral device control module 212 provides a read result (product ID, card ID, etc.) of the code reader DV2 or the card reader DV3 to the POS terminal 10 as the operation result. When an input request is accepted, the peripheral device control module 212 provides an input value (letter string etc.) acquired from the input device to the POS terminal 10 as the operation result. When an open request is accepted, the peripheral device control module 212 provides a state of the drawer DV6 (open state, closed state, etc.) to the POS terminal 10 as the operation result.

When an operation request with respect to a peripheral device DV not connected to the input/output I/F 202 is accepted, the peripheral device control module 212 returns an error to the POS terminal 10 as the operation result.

Hereinafter, operations of the POS terminal 10 and the peripheral device control apparatus 20 of the POS system 1 will be described.

Figure 5:
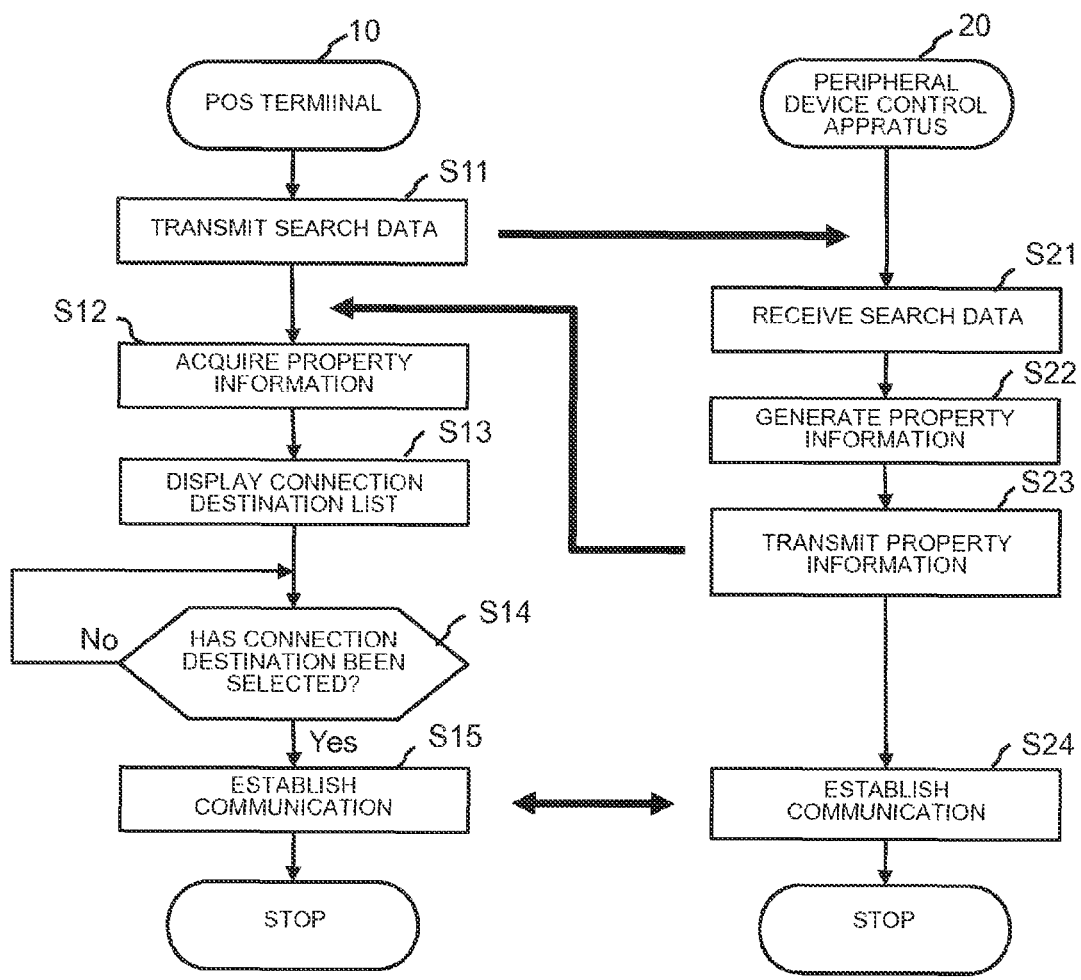
FIG. 5 is a flowchart showing an example of connection processing carried out by the POS terminal and the control apparatus for a peripheral device according to the first embodiment.

First, with reference to FIG. 5, connection processing related to a communication establishment between the POS terminal 10 and the peripheral device control apparatus 20 will be described. FIG. 5 is a flowchart showing an example of the connection processing carried out by the POS terminal 10 and the control apparatus 20.

In Step S11 shown in FIG. 5, the operation unit 15 of the POS terminal 10 accepts a predetermined operation from a shop assistant. The communication control module 111 transmits search data to the plurality of peripheral device control apparatuses 20 via the communication I/F 14. By transmitting the search data, the communication control module 111 searches for the control apparatus 20 installed in the periphery of the apparatus itself (POS terminal 10).

On the other hand, in Step S21, the communication control module 211 of the peripheral device control apparatus 20 accepts the search data transmitted from the POS terminal 10. As the communication control module 211 accepts the search data, the operation of the control apparatus 20 advances to Step S22. In Step S22, the communication control module 211 generates property information indicating properties of the apparatus itself (control apparatus 20) according to the search data. As the communication control module 211 generates the property information, the operation of the control apparatus 20 advances to Step S23. In Step S23, the communication control module 211 transmits the generated property information to the POS terminal 10 that has transmitted the search data.

On the other hand, when the communication control module 111 transmits the search data in Step S11, the operation of the POS terminal 10 advances to Step S12. In Step S12, the communication control module 111 of the POS terminal 10 receives the property information from the peripheral device control apparatuses 20. As the communication control module 111 receives the property information, the operation of the POS terminal 10 advances to Step S13. In Step S13, the display control module 113 displays a list of property information on the display unit 16 as a connection destination list in cooperation with the communication control module 111.

Figure 6:
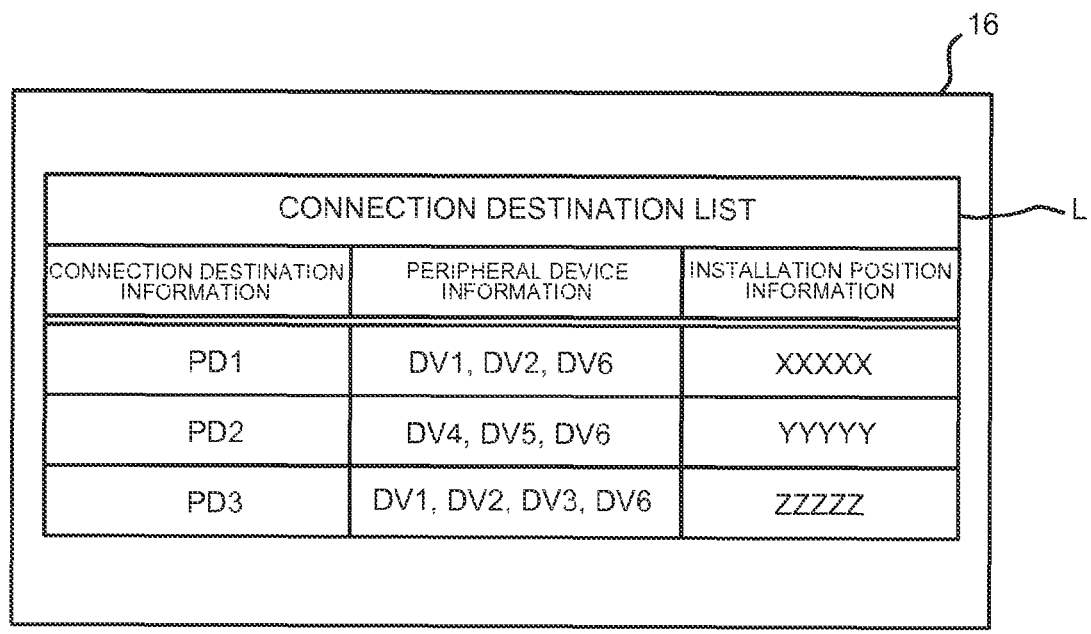
FIG. 6 is a diagram showing an example of a connection destination list displayed on a display unit of the POS terminal according to the first embodiment.

FIG. 6 is a diagram showing an example of a connection destination list L displayed on the display unit 16 of the POS terminal 10. The display unit 16 displays, as a list, the property information provided from the plurality of peripheral device control apparatuses 20. As shown in FIG. 6, the property information includes the connection destination information, the peripheral device information, and the installation position information. The display control module 113 displays, on the display unit 16, the connection destination information, the peripheral device information, and the installation position information included in one property information in association with one another. For example, the property information displayed in the top row of the connection destination list L includes "PD1" as the connection destination information, the type names "DV1", "DV2", and "DV6" as the peripheral device information, and "xxxxx" as the installation position information. Therefore, the property information is property information of the control apparatus 20 whose connection destination information is "PD1". In addition, the property information indicates that the printer DV1, the code reader DV2, and the drawer DV6 are connected to the control apparatus 20 whose connection destination information is "PD1". The property information also indicates that the control apparatus 20 whose connection destination information is "PD1" is installed at a position indicated by "xxxxx". Although only the type name of the peripheral device is displayed as the peripheral device information in the connection destination list L shown in FIG. 6, the function of the peripheral device may also be included for display.

Therefore, by referencing the connection destination list L, the operator of the POS terminal 10 such as a shop assistant can easily check the type names and functions of the peripheral devices DV connected to each of the peripheral device control apparatuses 20. The operator of the POS terminal 10 can easily check the installation positions of the control apparatuses 20, that is, the installation positions of the peripheral devices DV. By checking the installation positions of the peripheral devices DV, the operator of the POS terminal 10 can easily select a control apparatus 20 with desired functions or a control apparatus 20 installed near the current position. As a result, according to the POS system 1 of this embodiment, since the control apparatus 20 for the peripheral device DV can be selected with ease, convenience of the POS terminal 10 can be improved.

The display form of the connection destination list L (list of plurality of property information) is not limited to the example shown in FIG. 6. For example, the display control module 113 may extract partial information (e.g., connection destination information and peripheral device information) included in the property information and display them as a list on the display unit 16. Further, the display control module 113 may extract property information including peripheral device information of the peripheral device DV to be used by the terminal itself (POS terminal 10) from the plurality of property information, and display only the extracted property information on the display unit 16. Specifically, when such an extraction is performed, the display control module 113 carries out filtering of the property information based on the profiles of the peripheral devices DV to be used by the terminal itself (POS terminal 10), that are stored in the storage unit 17.

In Step S13 shown in FIG. 5, the operator of the POS terminal 10 can select one property information on the to-be-connection destination from the property information included in the displayed connection destination list. Upon accepting the selection of the property information displayed on the display unit 16 by the operator, the display control module 113 notifies that the selection of the property information has been accepted to the communication control module 111. Further, as the display control module 113 displays the connection destination list L on the display unit 16 in Step S13, the operation of the POS terminal 10 advances to Step S14. In Step S14, the communication control module 111 stands by until receiving the notification from the display control module 113 (No in Step S14). As the communication control module 111 receives the notification from the display control module 113 (Yes in Step S14), the operation of the POS terminal 10 advances to Step S15. In Step S15, the communication control module 111 establishes communication with the control apparatus 20 in cooperation with the communication control module 211 of the connection destination control apparatus 20. Therefore, the operation of the control apparatus 20 also advances to Step S24. In Step S24, in cooperation with the communication control module 111, the communication control module 211 establishes communication with the POS terminal 10. The operations for the connection processing for the POS terminal 10 and the control apparatus 20 end by the communication establishment.

By the operations for the connection processing shown in FIG. 5, the communication is established between the POS terminal 10 and the peripheral device control apparatus 20. In other words, the POS terminal 10 and the peripheral device DV are associated with each other.

Figure 7:
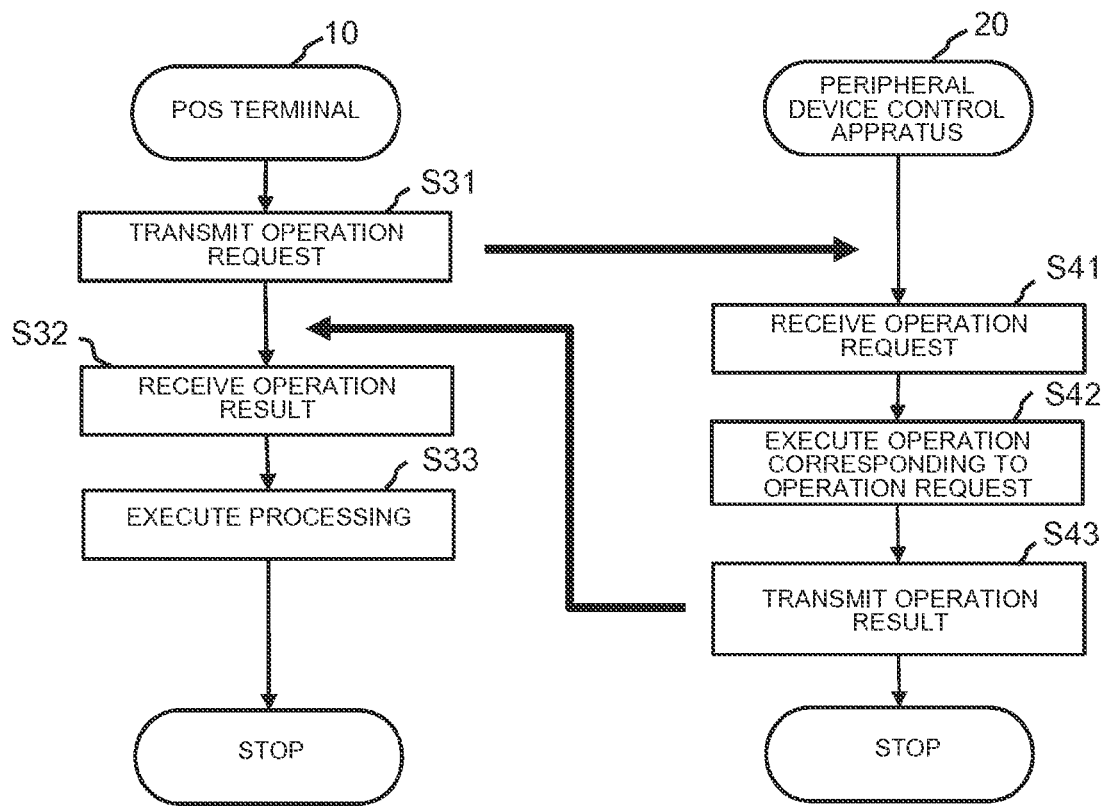
FIG. 7 is a flowchart showing an example of processing regarding a use of a peripheral device, that is carried out by the POS terminal and the control apparatus for a peripheral device according to the first embodiment.

Hereinafter, with reference to FIG. 7, processing related to a use of the peripheral device DV will be described. FIG. 7 is a flowchart showing an example of the peripheral device use processing carried out by the POS terminal 10 and the peripheral device control apparatus 20. The peripheral device use processing carried out by the POS terminal 10 and the control apparatus 20 is executed after the communication between the POS terminal 10 and the control apparatus 20 is established in the connection processing shown in FIG. 5.

In Step S31 shown in FIG. 7, the communication control module 111 of the POS terminal 10 transmits the operation request output from the settlement processing module 112 to the peripheral device control apparatus 20.

When the communication control module 111 transmits the operation request from the settlement processing module 112 to the control apparatus 20, the communication control module 211 of the control apparatus 20 receives the operation request from the POS terminal 10 in Step S41. As the communication control module 211 receives the operation request from the POS terminal 10, the operation of the control apparatus 20 advances to Step S42. In Step S42, the peripheral device control module 212 controls the peripheral device DV instructed by the operation request. The peripheral device control module 212 controls the peripheral device DV to carry out the operation requested by the operation request. As the peripheral device control module 212 controls the peripheral device DV to carry out the requested operation, the operation of the control apparatus 20 advances to Step S43. In Step S43, the peripheral device control module 212 acquires the operation result of the peripheral device DV in Step S42 from the peripheral device DV and outputs it to the communication control module 211. The communication control module 211 transmits the acquired operation result to the POS terminal 10 via the communication I/F 24.

On the other hand, upon transmitting the operation request to the control apparatus 20 in Step S31, the operation of the POS terminal 10 advances to Step S32. In Step S32, the communication control module 111 of the POS terminal 10 receives the operation result from the peripheral device control apparatus 20 via the communication I/F 14. As the communication control module 111 receives the operation result from the control apparatus 20, the operation of the POS terminal 10 advances to Step S33. In Step S33, the settlement processing module 112 uses the received operation result to execute processing related to product sales registration, settlement, and the like. Upon completing the processing in Step S33, the peripheral device use processing carried out by the POS terminal 10 and the control apparatus 20 ends.

By the use processing shown in FIG. 7, the POS terminal 10 can use the peripheral device DV of the control apparatus for which the communication has been established with respect to the POS terminal 10. When the peripheral device control module 212 of the control apparatus 20 transmits an error as the operation result in Step S43 shown in FIG. 7, the display control module 113 of the POS terminal 10 displays an error screen on the display unit 16.

According to the POS system 1 of this embodiment described above, by establishing communication with the peripheral device control apparatus 20, the POS terminal 10 can use the peripheral devices DV connected to the control apparatus 20. Therefore, the operator of the POS terminal 10 such as a shop assistant can easily use the peripheral devices DV. Accordingly, by the POS system, convenience of the POS terminal 10 regarding a use of the peripheral devices can be improved.

In the processing shown in FIG. 7, the peripheral device control apparatus 20 may receive, while communication with one POS terminal 10 is being established, a communication establishment request from another POS terminal 10. When a request is received from another POS terminal 10, the communication control module 211 of the control apparatus 20 may transmit information indicating connection unacceptableness to the another POS terminal 10 that has transmitted the communication establishment request. Moreover, the communication control module 211 of the control apparatus 20 may stop the provision of property information to the other POS terminals 10 while the communication with one POS terminal 10 is being established. By adopting this structure, the control apparatus 20 can reduce cases where, while communication with one POS terminal 10 is being established, a communication establishment request is transmitted from other POS terminals 10.

The programs to be executed by the apparatuses according to the embodiment described above are incorporated into the storage medium (ROM or storage unit) of the apparatuses in advance, but the method of providing the programs to the apparatuses is not limited thereto. For example, the programs may be provided to the apparatuses of this embodiment by being stored in a computer-readable storage medium such as a CD-ROM, a flexible disc (FD), a CD-R, and a DVD (Digital Versatile Disc) as a file in an installable form or a file in an executable form. Moreover, the storage medium is not limited to a medium independent from a computer or a built-in system. Examples of the storage medium include a non-transitory storage medium that stores a program and a storage medium that temporarily stores a program when downloading the program transmitted through the LAN, the Internet, or the like.

Furthermore, the programs to be executed by the apparatuses in the embodiment described above may be provided or distributed through a network such as the Internet.

While certain embodiments have been described, these embodiments have been presented by way of example only, and are not intended to limit the scope of the inventions. Indeed, the novel methods and systems described herein may be embodied in a variety of the other forms; furthermore, various omissions, substitutions and changes in the form the methods and systems described herein may be made without departing from the sprit of the inventions. The accompanying claims and their equivalents are intended to cover such forms or modifications as would fall within the scope and spirit of the inventions.

What is claimed is:

1. An information processing apparatus, comprising:
   a communication interface that communicates with an external apparatus;
   an input/output interface that connects a peripheral device to be used by the external apparatus;
   a communication control module that transmits property information including connection destination information and peripheral device information related to the peripheral device connected to the input/output interface to the external apparatus via the communication interface for establishing communication with the external apparatus and receives an operation request from the external apparatus for which the communication has been established via the communication interface; and
   a peripheral device control module that causes the peripheral device connected to the input/output interface to operate in response to the operation request received from the external apparatus, wherein
   the peripheral device information includes information on a type name of the peripheral device and a function of the peripheral device.

2. The information processing apparatus according to claim 1, further comprising:
   a storage unit that stores a profile of the peripheral device, the profile of the peripheral device indicating the information on a type name of the peripheral device and a function of the peripheral device,
   wherein the communication control module generates the peripheral device information based on the profile of the peripheral device stored in the storage unit and incorporates the generated peripheral device information in the property information.

3. The information processing apparatus according to claim 2,
   wherein the property information further includes installation position information indicating an installation position of the information processing apparatus.

4. The information processing apparatus according to claim 3, wherein
   the storage unit stores the installation position information, and
   the communication control module incorporates the installation position information stored in the storage unit in the property information.

5. The information processing apparatus according to claim 1, wherein
   the peripheral device control module receives an operation result with respect to the operation request from the peripheral device and outputs the operation result to the communication control module, and
   the communication control module transmits the operation result output from the peripheral device control module to the external apparatus via the communication interface.

6. The information processing apparatus according to claim 5,
   wherein the communication control module communicates with a terminal apparatus that performs product sales registration and settlement processing as the external apparatus via the communication interface.

* * * * *